UNITED STATES PATENT OFFICE.

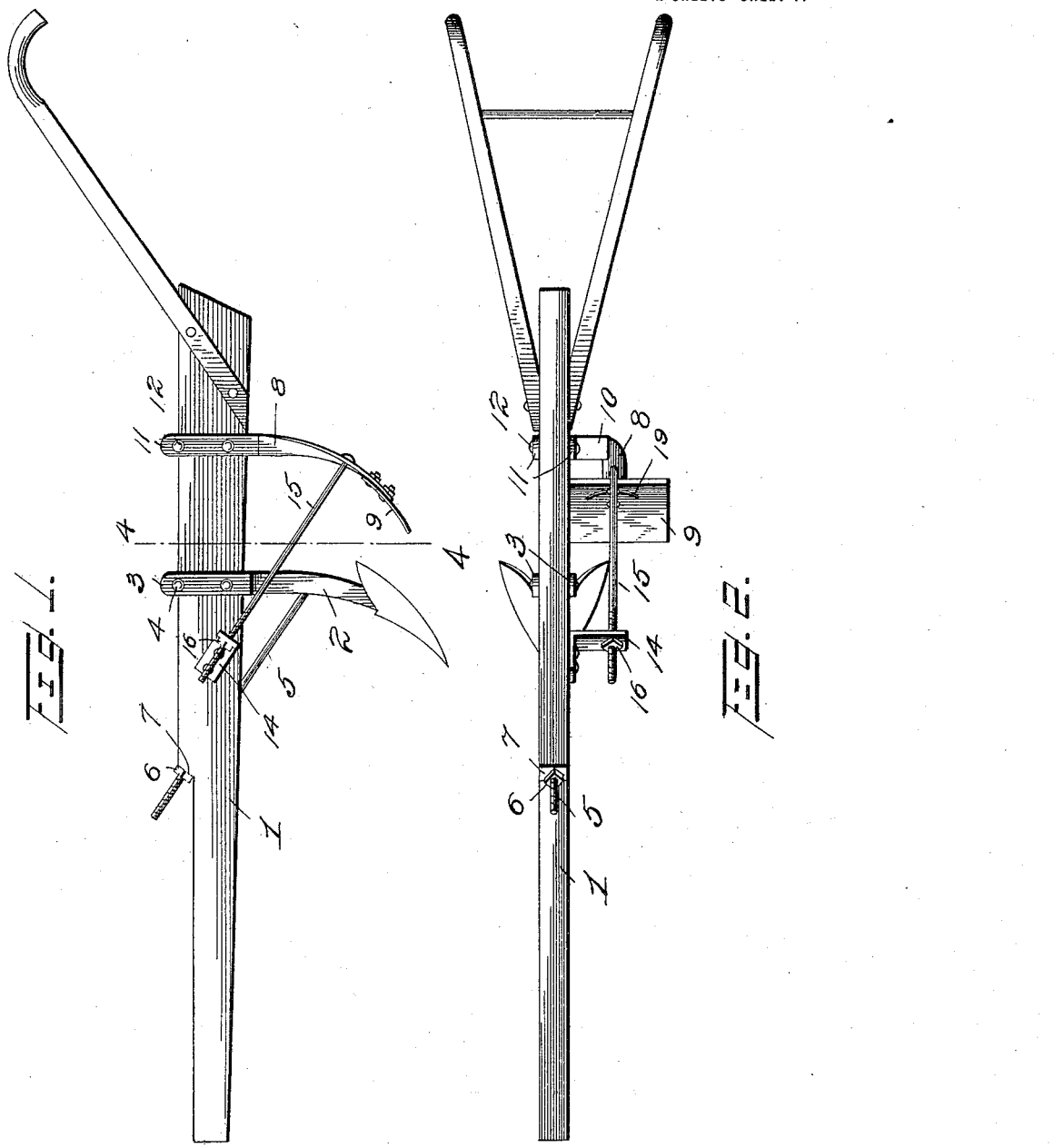

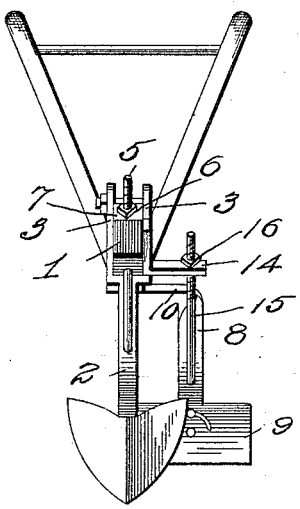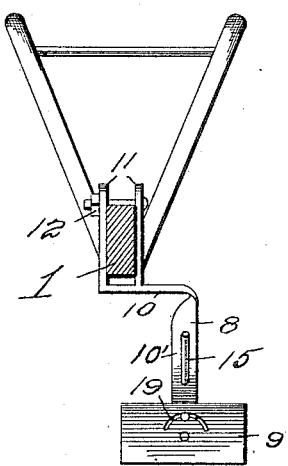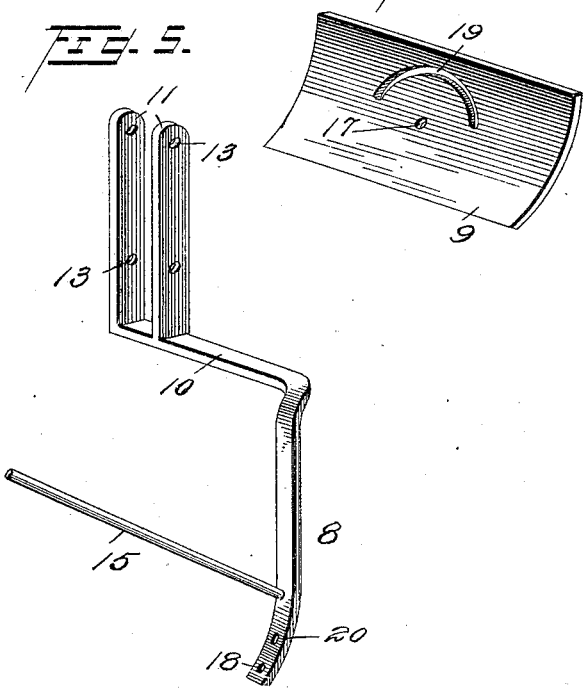

WILLIAM H. FURLOW AND JOHN C. DUNN, OF HAMPTON, ARKANSAS.

PLOW.

1,206,757. Specification of Letters Patent. Patented Nov. 28, 1916.

Application filed September 28, 1911. Serial No. 651,837.

*To all whom it may concern:*

Be it known that we, WILLIAM H. FURLOW and JOHN C. DUNN, citizens of the United States, residing at Hampton, in the county of Calhoun and State of Arkansas, have invented certain new and useful Improvements in Plows, of which the following is a specification.

Our invention has relation to new and useful improvements in plows and especially to means for throwing dirt into the plow furrow. The plow which makes the furrow runs 8 inches from the drill and throws fresh dirt into the same.

Reference being had to the drawings: Figure 1 is a side elevational view of a plow embodying our improvements. Fig. 2 is a top plan view of the same. Fig. 3 is a front elevational view of the same. Fig. 4 is a vertical, transverse, sectional view of our improved plow taken on the line 4—4 of Fig. 1. Fig. 5 is a perspective view of the scraper standard. Fig. 6 is a perspective view of the scraper blade employed.

Referring more particularly to the drawings, in which like numerals designate like parts throughout, our invention is described as follows:

The plow beam 1 has secured thereto approximately centrally, the plow standard 2, the upper end of which standard is bifurcated, the prongs 3 of which bifurcated portion straddle said beam. Said standard 2 is held to the beam by means of nut and bolt connections passing through perforations 4 in the bifurcated portion thereof and in said beam. Said standard is strengthened or supported by means of a grass rod 5 which extends slantingly through a hole in the beam and is provided with a number of threads upon its outer end. A nut 6 which engages said threads abuts a shoulder 7 of the beam thereby securing said grass rod rigidly in position.

The standard 8 of the scraper 9 does not extend directly down from the beam 1 but is laterally offset at 10 then projecting downwardly, forwardly and slightly outwardly, as shown at 10′, whatever distance is required in the construction of the plow. The amount of offset is approximately 4 or 5 inches. The upper end of said standard 8 is also bifurcated forming prongs 11 which prongs are secured to the beam in rear of said standard 2 by means of nut and bolt connections 12 passing through perforations 13 therein and in the beam.

A bracket 14 is provided on that side of the beam to which the standard 8 is offset, said bracket being rigidly secured to the beam. A grass rod 15 extends slantingly upward from adjacent the lower end of the standard 8 and extends through a perforation adjacent the outer end of that part of the bracket which extends at right angles to said beam 1. Threads are provided upon the upper end of the grass rod 15, said threads engaging a nut 16 which binds against the face of the bracket and aids said grass rod 15 in supporting and strengthening the standard 8.

The scraper blade 9 is pivotally secured to the lower end of the standard 8 by means of nut and bolt connections passing through a central perforation 17 in said blade and a corresponding registering perforation 18 in said standard. A curved opening 19 is provided in the scraper blade, which opening has for its center the perforation 17. Nut and bolt connections pass through said curved opening 19 and a perforation 20 in the foot 8, thereby enabling the operator to adjust the standard in various positions when the last-mentioned nut and bolt connections are loosened, when they may again be tightened securing said blade temporarily but rigidly in the position in which it has been placed.

The position to which the scraper blade is adjusted depends upon the amount of dirt that it is desired to throw into the plow furrow or up against the side of cotton, corn, potatoes or other farm produce being cultivated.

Although we have specifically described the novel features of construction, combination and arrangement of the several parts of our invention, yet we do not confine ourselves to such specific construction, combination and arrangement of parts but reserve and may exercise the right to make such changes therein as do not depart from the spirit of the invention or the scope of the appended claims.

Having described our invention, what we claim as new and desire to secure by Letters Patent, is:

A device of the type described, including a plow-equipped beam, and a scraper-carrying standard, the upper portion of said standard being bifurcated forming prongs, which bifurcated portion straddles said beam, the prongs thereof being secured to the latter, said standard being laterally offset at the lower end of the bifurcated portion thereof then projecting downwardly, forwardly and slightly outwardly from the outer end of said lateral offset, a bracket, right-angled in structure, secured to the same side of the beam to which the scraper-carrying standard is offset, the outstanding arm of the bracket being perforated, a grass rod interposed between the outstanding arm and the scraper-carrying standard, one end of the latter being received by and retained in the perforation of the outstanding arm, the other arm of the bracket secured to the beam.

In testimony whereof we affix our signatures in presence of two witnesses.

WILLIAM H. FURLOW.
JOHN C. DUNN.

Witnesses:
T. N. MEANS,
C. C. CAMPBELL.

Copies of this patent may be obtained for five cents each, by addressing the "Commissioner of Patents, Washington, D. C."